(12) United States Patent
Beyer et al.

(10) Patent No.: US 8,032,732 B2
(45) Date of Patent: Oct. 4, 2011

(54) SYSTEM AND METHOD FOR GENERATING A CACHE-AWARE BLOOM FILTER

(75) Inventors: Kevin Scott Beyer, San Jose, CA (US); Sridhar Rajagopalan, Salford (GB)

(73) Assignee: International Business Machines Corporatio, Armonk, NY (US)

( * ) Notice: Subject to any disclaimer, the term of this patent is extended or adjusted under 35 U.S.C. 154(b) by 715 days.

(21) Appl. No.: 12/134,125

(22) Filed: Jun. 5, 2008

(65) Prior Publication Data

US 2008/0243941 A1    Oct. 2, 2008

Related U.S. Application Data

(63) Continuation of application No. 11/614,790, filed on Dec. 21, 2006, now abandoned.

(51) Int. Cl.
*G06F 12/00* (2006.01)

(52) U.S. Cl. ............ 711/173; 711/3; 711/129; 711/153; 711/159; 711/208; 711/209; 711/216; 711/E12.01

(58) Field of Classification Search .............. 711/3, 129, 711/153, 159, 173, 208, 209, 216, E12.01, 711/154, 170, 118, 202, 205, 206, 207; 710/68; 714/48, 6, 7; 345/555
See application file for complete search history.

(56) References Cited

U.S. PATENT DOCUMENTS

| | | | |
|---|---|---|---|
| 6,366,994 B1 | 4/2002 | Kalyur | |
| 6,370,622 B1 | 4/2002 | Chiou et al. | |
| 6,567,815 B1 | 5/2003 | Rubin et al. | |
| 7,487,317 B1 | 2/2009 | Fedorova et al. | |
| 2003/0208665 A1 | 11/2003 | Peir et al. | |
| 2006/0161607 A1 | 7/2006 | Gustavson et al. | |
| 2006/0294311 A1 | 12/2006 | Fu et al. | |
| 2008/0147714 A1 | 6/2008 | Breternitz et al. | |
| 2008/0256094 A1 | 10/2008 | Gupta et al. | |
| 2008/0313132 A1 | 12/2008 | Hao et al. | |

OTHER PUBLICATIONS

Notice of Allowance from U.S. Appl. No. 11/614,790 dated May 13, 2009.

*Primary Examiner* — Kevin Ellis
*Assistant Examiner* — Mehdi Namazi
(74) *Attorney, Agent, or Firm* — Shimokaji & Associates, P.C.

(57) ABSTRACT

A cache-aware Bloom filter system segments a bit vector of a cache-aware Bloom filter into fixed-size blocks. The system hashes an item to be inserted into the cache-aware Bloom filter to identify one of the fixed-size blocks as a selected block for receiving the item and hashes the item k times to generate k hashed values for encoding the item for insertion in the in the selected block. The system sets bits within the selected block with addresses corresponding to the k hashed values such that accessing the item in the cache-aware Bloom filter requires accessing only the selected block to check the k hashed values. The size of the fixed-size block corresponds to a cache-line size of an associated computer architecture on which the cache-aware Bloom filter is installed.

19 Claims, 5 Drawing Sheets

SYSTEM AND METHOD FOR GENERATING A CACHE-AWARE BLOOM FILTER

CROSS-REFERENCE TO RELATED APPLICATION

The present application relates to co-pending application titled "System and Method for Generating and Using a Dynamic Bloom Filter," Ser. No. 11/614,844, which is filed concurrently herewith, and which is incorporated herein by reference in its entirety.

FIELD OF THE INVENTION

The present invention generally relates to data structures and in particular to Bloom filters. More specifically, the present invention relates to a Bloom filter that minimizes cache faults when accessing items encoded in the Bloom filter.

BACKGROUND OF THE INVENTION

A Bloom filter is a space-efficient probabilistic data structure used to test whether an element is a member of a set. This member test can yield false positives but not false negatives. The more elements that are added to the set contained in the Bloom filter, the larger the probability of false positives. Bloom filters have a strong space advantage over other data structures, such as self-balancing search trees, tries, hash tables, or simple arrays or linked lists of the entries.

A Bloom filter is an approximate encoding of a set of items or keys using a bit vector of b bits. During encoding, the item is hashed to a number between 1 to b and the corresponding bit in the bit vector is set. To check if an item is a member of the set, the item is hashed and the status of the bit is checked. If the bit is not set, then the item is definitely not in the set. If the bit is set, then either the item is in the set or the hash value of this item collided with the hash value of some other item that is in the set. Because of hash collisions, a Bloom filter can produce false positives (the item is reported as in the set, but it is not), but it never produces false negatives (the item is in the set, but not reported).

Conventional approaches improve the effectiveness of a Bloom filter by hashing each item several times with independent hash functions. For example, k hashes are used. To encode an item x, the k bits in the bit vector that correspond to $h_i(x)$ for $1 \leq i \leq k$ are set. (The same bit may be picked any number of times). To check if item y is a member of the set, item y is hashed k times using the same hash functions. The bit corresponding to $h_i(x)$ is examined to determine whether it is set for all $1 \leq i \leq k$. If any of the k bits are not set, then y cannot be a member of the set; otherwise, all k bits are set and item y is either in the set or a false positive.

Conventional Bloom filters have control points comprising the number of items in the input (n), the amount of memory (b), the number of hash functions (k), and the probability of a false positive (i.e., the false positive rate or fpr). Fixing the size of the input allows the choice of two of the other control point parameters. Memory and the number of hash functions are related. If the number of hashes is fixed and memory is increased, the false positive rate continually decreases. However, if the memory is fixed and the number of hash functions is increased, the false positive rate exhibits a minimum when an expected density (i.e., the percentage of bits set to 1) for the conventional Bloom filter is approximately 50%.

Although conventional Bloom filter technology has proven to be useful, it would be desirable to present additional improvements. A conventional Bloom filter is built and then populated with a set of items or keys. To build a conventional Bloom filter, a user has to know approximately how many keys will populate the conventional Bloom filter to know how much memory to allocate to the conventional Bloom filter. However, in many applications the number of keys is not known prior to building the conventional Bloom filter. Consequently, a user is forced to overestimate the number of keys anticipated for the conventional Bloom filter, leading to inefficient use of memory. Furthermore, inefficient use of memory may lead to a false positive rate that is less than optimum.

However, in a large Bloom filter, the set of bits may be widely distributed throughout the Bloom filter and located on different pages in the memory. Each bit accessed by the query may require a different page; each page accessed requires a cache fault. Cache faults are expensive in terms of processing time.

What is therefore needed is a system, a computer program product, and an associated method for generating a cache-aware Bloom filter that minimizes cache faults by mapping keys to bits such that bits for a key are co-located on the same memory page. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for generating a cache-aware Bloom filter.

The present system segments a bit vector of the cache-aware Bloom filter into fixed-size blocks. The present system further hashes an item to be inserted into the cache-aware Bloom filter to identify one of the fixed-size blocks as a selected block for receiving the item and hashes the item k times to generate k hashed values for encoding the item for insertion in the cache-aware Bloom filter in the selected block. The present system sets bits within the selected block with addresses corresponding to the k hashed values such that accessing the item in the cache-aware Bloom filter requires accessing only the selected block to check the k hashed values.

The size of the fixed-size block corresponds to a cache-line size of an associated computer architecture on which the cache-aware Bloom filter is installed. In one embodiment, the size of the fixed-size block is 128 bytes. In another embodiment, the size of the fixed-size block is 256 bytes.

It is to be understood that the block size can be determined by the cache size at any level of the memory hierarchy depending upon how large the Bloom filter is and where it is stored. For example, the block size could be any small multiple of the following:
 a) the register size of the cpu;
 b) the L1 cache width of the memory subsystem;
 c) the L2 cache width of the memory subsystem;
 d) the L3 cache width of the memory subsystem;
 e) the local memory size of a cell processor;
 f) the disk block size;
 g) the file-system or database buffer size; or
 h) the network transfer unit.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
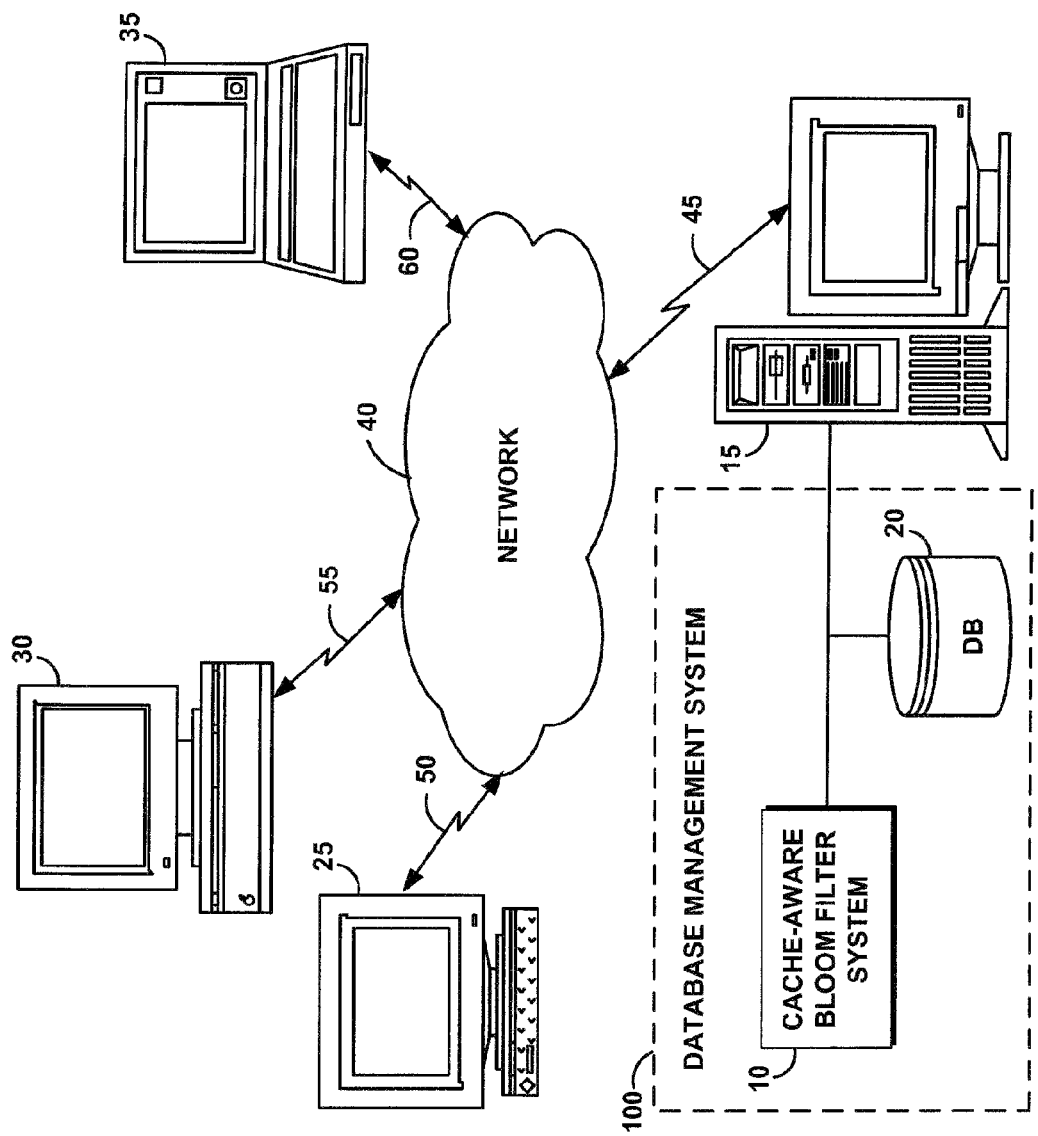
FIG. 1 is a schematic illustration of an exemplary operating environment in which a cache-aware Bloom filter system of the present invention can be used.

FIG. 1 portrays an exemplary overall environment in which a system, a computer program product, and an associated method (the cache-aware Bloom filter system 10 or the "system 10") for generating and using a cache-aware Bloom filter according to the present invention may be used. System 10 comprises a software programming code or a computer program product that is typically embedded within, or installed on a server 15. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

In an exemplary use of system 10, a database management system 100 comprises a database (dB) 20 and system 10. Users, such as remote Internet users, are represented by a variety of computers such as computers 25, 30, 35, and can access the host server 15 through a network 40. Computers 25, 30, 35, access system 10 to determine whether an element is a member of a set stored in system 10.

System 10 returns a negative if the element is not a member of the set. System 10 returns a positive if the element is in the set. System 10 may return a false positive if the element is not in the set. System 10 does not return false negatives. While described in terms of the database management system 100, it should be clear that system 10 is applicable as well to, for example, any implementation in which a Bloom filter may be used.

Compared to a conventional Bloom filter, system 10 reduces L1 or L2 cache faults incurred when accessing an item inserted in a cache-aware Bloom filter. System 10 achieves reduced cache faults by setting the bits for one entry in a small range of bit locations, typically within one cache line.

Figure 2:
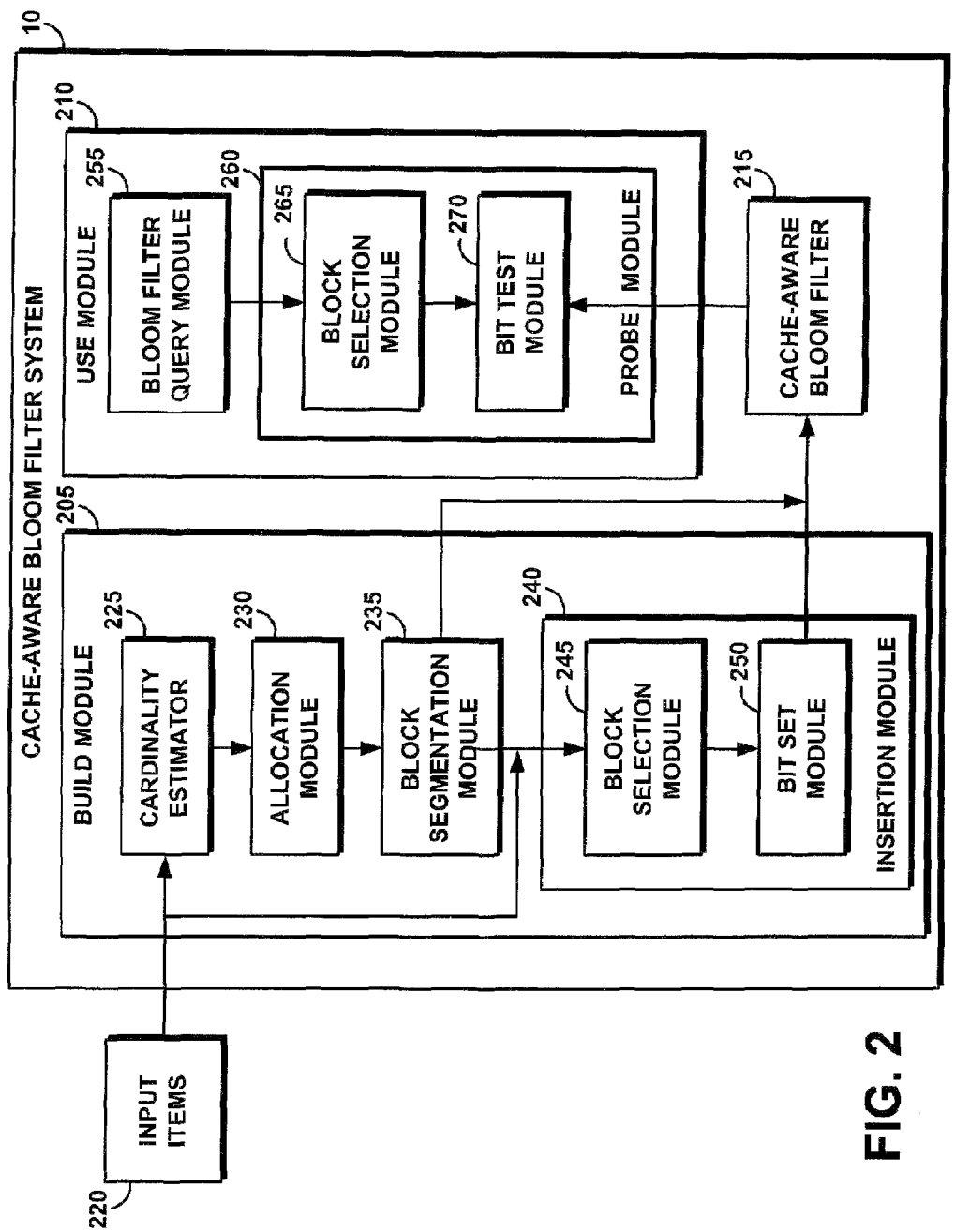
FIG. 2 is a block diagram of the high-level architecture of the cache-aware Bloom filter system of FIG. 1.

FIG. 2 illustrates a high-level hierarchy of system 10. System 10 comprises a build module 205 and a use module 210. The build module 205 generates the cache-aware Bloom filter 215 and populates the cache-aware Bloom filter 215 using input items 220. The build module 205 comprises a cardinality estimator 225, a filter allocation module 230, a block segmentation module 235, and an insertion module 240. The insertion module 240 comprises a block selection module 245 and a bit set module 250. The use module 210 provides query access by a user to the cache-aware Bloom filter 215. The use module 210 comprises a Bloom filter query module 255 and probe module 260. The probe module 260 comprises a block selection module 265 and bit test module 270.

Figure 3:
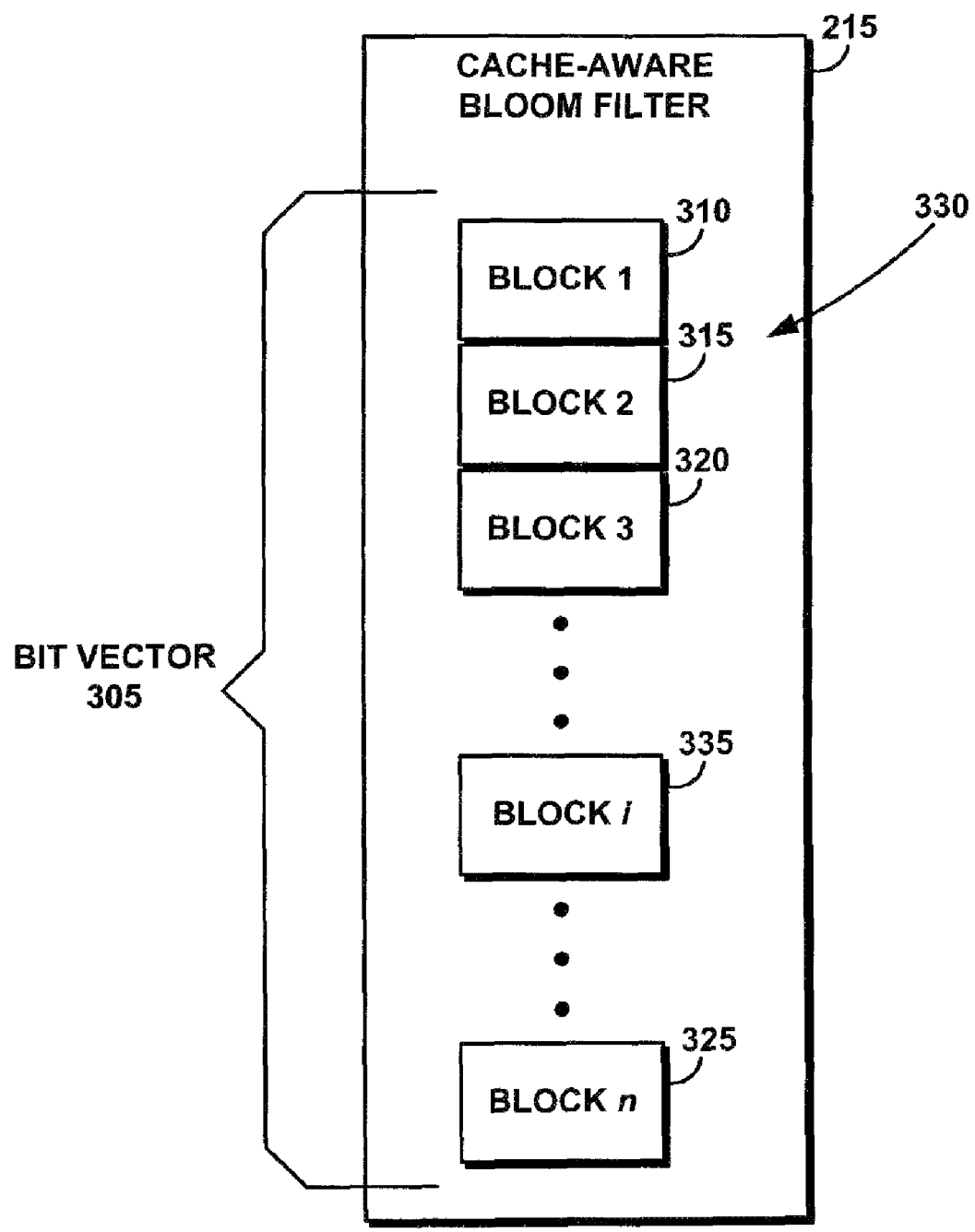
FIG. 3 is a diagram of an exemplary bit vector of a cache-aware Bloom filter system of FIGS. 1 and 2.

FIG. 3 illustrates a block diagram of the cache-aware Bloom filter 215. The cache-aware Bloom filter 215 comprises a bit vector 305. The block segmentation module 230 segments the bit vector 305 into fixed-size cache-aligned blocks such as a block 1, 310, a block 2, 315, a block 3, 320, through block n, 325, collectively referenced as blocks 330. A block i, 335, represents in general any one of the blocks 330.

Figure 4:
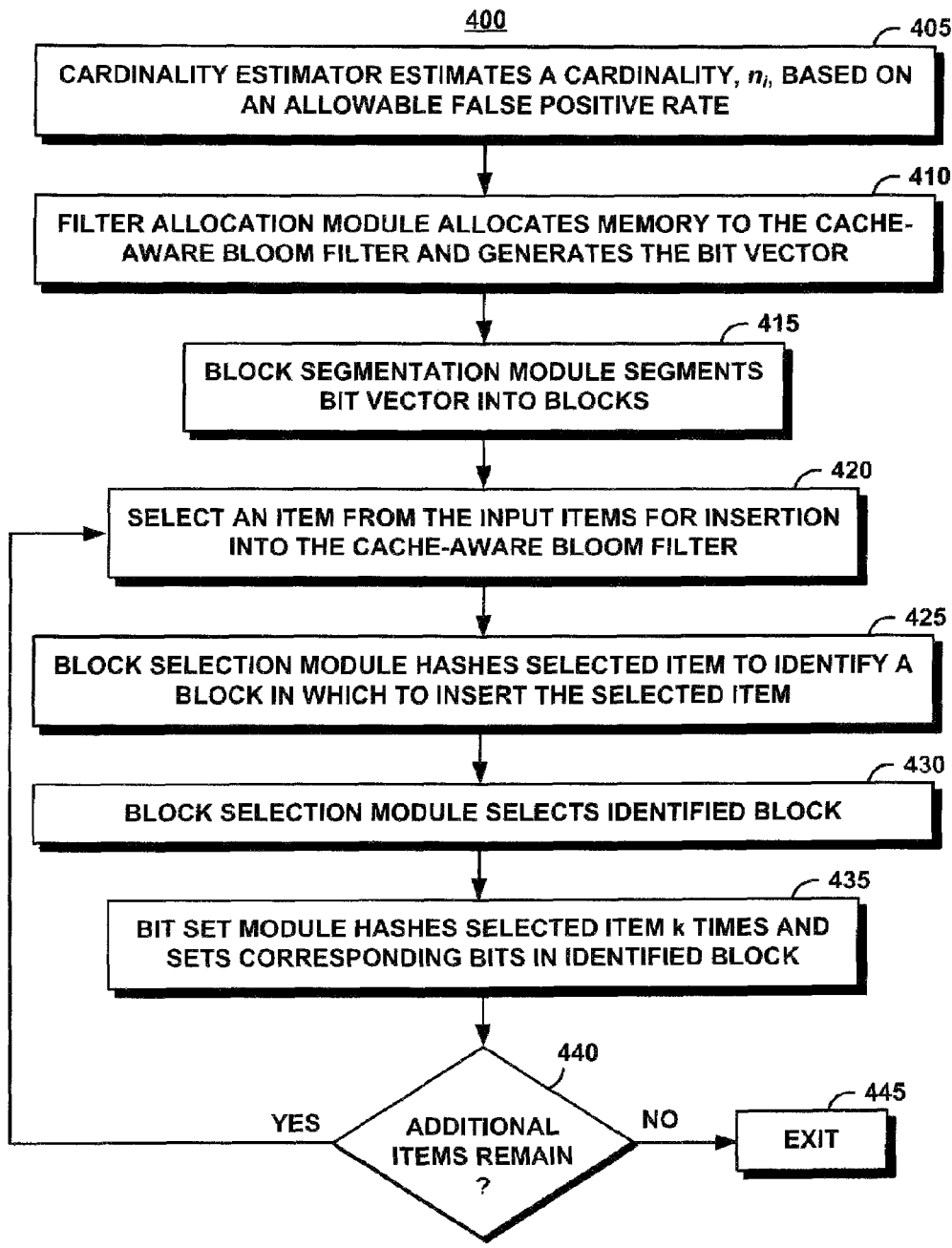
FIG. 4 is a process flow chart illustrating a method of operation of the cache-aware Bloom filter system of FIGS. 1 and 2 in generating a cache-aware Bloom filter.

FIG. 4 illustrates a method 400 of system 10 in generating the cache-aware Bloom filter 215. The cardinality estimator 225 estimates a cardinality, $n_i$, for the input items 220 based on an allowable false positive rate, f (step 405). The allocation module 230 allocates memory to the cache-aware Bloom filter 215 and generates the bit vector 305 for the cache-aware Bloom filter 215 (step 410). The block segmentation module 230 segments the bit vector 305 into blocks 330 (step 415).

The blocks 330 are fixed-sized, cache-aligned blocks; in one embodiment, the size of each of the blocks 330 corresponds to the size of a single cache line. In another embodiment, the block segmentation module 235 segments the bit vector 305 into blocks 330 of size 128 bytes, or 1024 bits. Modern computer architectures typically have a cache-line size of 128 bytes. In another embodiment, the block segmentation module 235 segments the bit vector 305 into blocks 330 of size 256 bytes for a computer architecture with a cache-line size of 256 bytes. The block segmentation module 235 can segment the bit vector 305 into blocks 330 of any desired size.

The insertion module 240 selects an item from the input items 220 for insertion into the cache-aware Bloom filter 215 (step 420). The block selection module 245 hashes the selected item to identify the block i, 335, in which to insert the selected item (step 425). The block selection module 245 selects the identified block i, 335 (step 430). The bit set module 250 hashes the selected item k times and the corresponding bits are set within the block i, 335 (step 435). The insertion module 240 determines whether additional items in the input items 220 remain for processing (decision step 440). If no, the insertion module 240 exits method 400 (step 445). Otherwise, the insertion module 240 returns to step 420 and repeats steps 420 through 440 until no additional items in the input items 220 remain for processing.

Each of the blocks 330 acts as a mini-Bloom filter. Consequently, for each item queried in the cache-aware Bloom filter 215, system 10 reduces the potential cache fault from k to 1, compared to a conventional Bloom filter. The fraction of computing time spent waiting for memory to be accessed has been increasing for the past several years and is expected to continue to increase. Therefore, any significant reduction in data cache misses will improve the processing time of an entire algorithm.

Dividing the cache-aware Bloom filter 215 in the manner described by method 400 introduces a bias that increases the false positive rate. Some of the blocks 330 may have significantly more entries than others. For example, if 1 million items are encoded in 11627 blocks with 86 entries per block (typical numbers for 1 K bit block size and false positive rate=1/256), the block i, 335, with the maximum number of entries is expected to have approximately 123 entries (derived empirically), or about 45% more entries than average.

This increase in the false positive rate depends on the block size; for smaller blocks 330 (less than 128 bytes), the effect is more pronounced. For a block size of 1 K bits, the increase in the false positive rate is modest, and can be compensated for by a small increase in the allocated memory (approximately 2%).

Figure 5:
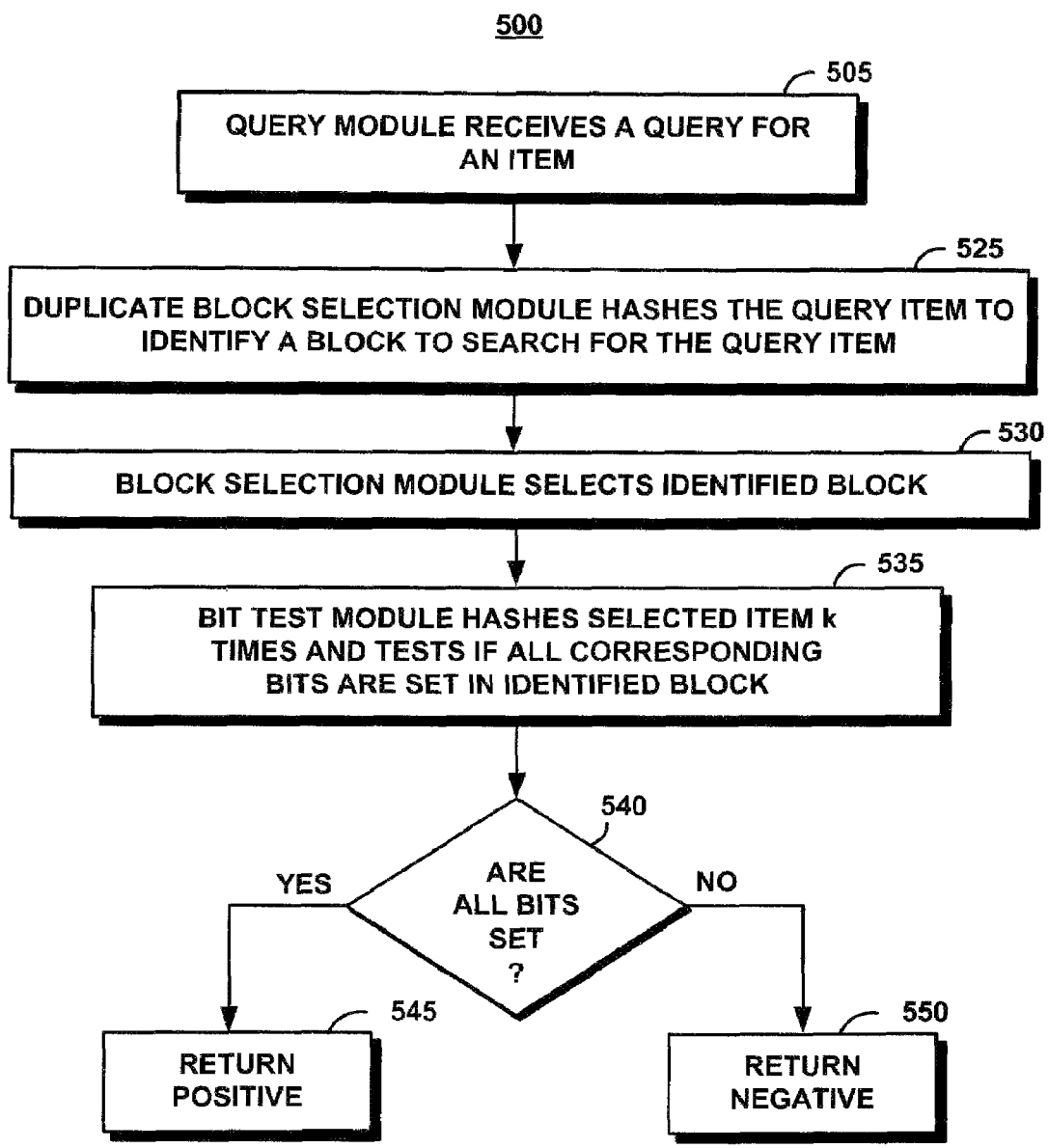
FIG. 5 is a process flow chart illustrating a method of operation of the cache-aware Bloom filter system of FIGS. 1 and 2 in querying a cache-aware Bloom filter.

Referring to FIG. 5, it illustrates method 500 for querying a cache-aware Bloom filter of the use module 210. The query module 255 receives a query for an item (step 505). The block selection module 265 hashes the queried item to identify the block i, 335, in which to search for the selected item (step 525). The bit test module 270 hashes the selected item k times and checks if the corresponding bits are set within the block i, 335 (step 535). If all k bits are set at step 540, the bit test module 270 returns a positive result (i.e., the queried item might be in the encoded items) (step 545). Otherwise, it returns a negative result (i.e., the queried item is definitely not in the encoded items) (step 550).

It is to be understood that the specific embodiments of the invention that have been described are merely illustrative of certain applications of the principle of the present invention. Numerous modifications may be made to the system and method for generating a cache-aware Bloom filter described herein without departing from the spirit and scope of the present invention.

What is claimed is:

1. A processor-implemented method of generating a cache-aware Bloom filter, comprising:
    segmenting a bit vector of the cache-aware Bloom filter into a plurality of fixed-size blocks;
    hashing an item to be inserted into the cache-aware Bloom filter, to identify one of the fixed-size blocks as a selected block for receiving the item;
    hashing the item k times to generate k hashed values for encoding the item, in order to insert the encoded item in the cache-aware Bloom filter in the selected block;
    setting a plurality of bits within the selected block with addresses corresponding to the k hashed values, so that accessing the item in the cache-aware Bloom filter requires accessing only the selected block to check the k hashed values.

2. The method of claim 1, wherein a size of the identified fixed-size block corresponds to a cache-line size of an associated computer architecture on which the cache-aware Bloom filter is installed.

3. The method of claim 2, wherein the size of the fixed-size block is 128 bytes.

4. The method of claim 2, wherein the size of the fixed-size block is 256 bytes.

5. The method of claim 1, further comprising increasing a memory in order to compensate for an increase in the false positive rate.

6. The method of claim 1, wherein segmenting the bit vector of the cache-aware Bloom filter into a plurality of fixed-size blocks, includes determining the block size by the cache size of a memory system based on a size and storage location of the Bloom filter.

7. A processor-implemented system for generating a cache-aware Bloom filter, comprising:
    a block segmentation module for segmenting a bit vector of the cache-aware Bloom filter into a plurality of fixed-size blocks;
    an insertion module for hashing an item to be inserted into the cache-aware Bloom filter, to identify one of the fixed-size blocks as a selected block for receiving the item;
    a block selection module for hashing the item k times to generate k hashed values for encoding the item, in order to insert the encoded item in the cache-aware Bloom filter in the selected block; and
    a bit set module for setting a plurality of bits within the selected block with addresses corresponding to the k hashed values, so that accessing the item in the cache-aware Bloom filter requires accessing only the selected block to check the k hashed values.

8. The system of claim 7, wherein a size of the identified fixed-size block corresponds to a cache-line size of an associated computer architecture on which the cache-aware Bloom filter is installed.

9. The system of claim 8, wherein the size of the fixed-size block is 128 bytes.

10. The system of claim 8, wherein the size of the fixed-size block is 256 bytes.

11. The system of claim 7, further comprising means for increasing a memory in order to compensate for an increase in the false positive rate.

12. The system of claim 7, wherein the block segmentation module segments the bit vector of the cache-aware Bloom filter into a plurality of fixed-size blocks by determining the block size relative to the cache size of a memory system based on a size and storage location of the Bloom filter.

13. A computer program product having a plurality of executable instruction codes stored on a non-transitory computer usable storage medium, for generating a cache-aware Bloom filter, comprising:
    a set of instruction codes for segmenting a bit vector of the cache-aware Bloom filter into a plurality of fixed-size blocks;

a set of instruction codes for hashing an item to be inserted into the cache-aware Bloom filter, to identify one of the fixed-size blocks as a selected block for receiving the item;

a set of instruction codes for hashing the item k times to generate k hashed values for encoding the item, in order to insert the encoded item in the cache-aware Bloom filter in the selected block; and a set of instruction codes for setting a plurality of bits within the selected block with addresses corresponding to the k hashed values, so that accessing the item in the cache-aware Bloom filter requires accessing only the selected block to check the k hashed values.

14. The computer program product of claim 13, wherein a size of the identified fixed-size block corresponds to a cache-line size of an associated computer architecture on which the cache-aware Bloom filter is installed.

15. The computer program product of claim 14, wherein the size of the fixed-size block is 128 bytes.

16. The computer program product of claim 14, wherein the size of the fixed-size block is 256 bytes.

17. The computer program product of claim 13, further comprising a set of instruction codes for increasing a memory in order to compensate for an increase in the false positive rate.

18. The computer program product of claim 13, wherein the set of instruction codes for segmenting the bit vector of the cache-aware Bloom filter into a plurality of fixed-size blocks determines the block size relative to the cache size of a memory system based on a size and storage location of the Bloom filter.

19. A processor-implemented method of generating a cache-aware Bloom filter, comprising:

segmenting a bit vector of the cache-aware Bloom filter into a plurality of fixed-size blocks, wherein a block size of each fixed-size block corresponds to a cache-line size of an associated computer architecture on which the cache-aware Bloom filter is installed;

segmenting the bit vector of the cache-aware Bloom filter into a plurality of fixed-size blocks includes determining the block size by the cache-line size of a memory system based on a size and storage location of the Bloom filter;

segmenting the bit vector of the cache-aware Bloom filter into a plurality of fixed-size blocks includes compensating for a bias that increases a false positive rate by increasing a memory in order to compensate for an increase in the false positive rate until the false positive rate is reduced to an allowable false positive rate;

hashing an item to be inserted into the cache-aware Bloom filter to identify one of the fixed-size blocks as a selected block for receiving the item;

hashing the item k times to generate k hashed values for encoding the item in order to insert the encoded item in the cache-aware Bloom filter in the selected block; and setting a plurality of bits within the selected block with addresses corresponding to the k hashed values so that accessing the item in the cache-aware Bloom filter requires accessing only the selected block to check the k hashed values.

* * * * *